United States Patent Office 3,836,511
Patented Sept. 17, 1974

3,836,511
PROCESS FOR SULFONATING UNSATURATED ELASTOMERS
Charles P. O'Farrell, Clark, and George E. Serniuk, Roselle, N.J., assignors to Esso Research and Engineering Company
No Drawing. Continuation-in-part of abandoned application Ser. No. 123,908, Mar. 12, 1971. This application Mar. 29, 1972, Ser. No. 239,307
Int. Cl. C08d 11/02, 13/30
U.S. Cl. 260—79.3 R
10 Claims

ABSTRACT OF THE DISCLOSURE

A process for sulfonating unsaturated elastomers which comprises sulfonating an olefinically unsaturated elastomer using as the sulfonating agent an acyl sulfate. The products produced thereby have improved properties over those sulfonated elastomers prepared by prior art methods. The preferred acyl sulfate is acetyl sulfate. The sulfonated elastomers of this invention are useful as films, adhesives and for other general purpose rubber uses. Especially advantageous properties are obtained when the sulfonic acid polymer is neutralized with ethylamine.

CROSS-REFERENCE TO RELATED APPLICATIONS

This application is a continuation-in-part of U.S. application No. 123,908, filed Mar. 12, 1971, now abandoned.

BACKGROUND OF THE INVENTION

This invention relates to novel polymers prepared containing sulfonic acid groups or sulfonic acid salts and the process for preparing said polymers.

Hydrocarbon polymers generally fall into two classes, thermoplastic and thermosetting resins. Thermoplastic resins may be readily worked by heating the polymer to its softening or melting point. They may then be processed by such deformation methods as vacuum forming, extrusion of a melt, compression molding, etc. The thermoset resins can generally not be reworked once they have hardened. In general, thermoset resins owe their unique properties to covalent crosslinks between polymer molecules. The crosslinks may be obtained by the interaction of various monomers such as styrene in the presence of small amounts of divinyl benzene or by the reaction of epoxy-type resins with polyamines.

Uncured elastomers such as natural rubber and butyl rubber are thermoplastic. They may, however, be crosslinked or vulcanized by the use of sulfur and accelerators which react with the carbons of the unsaturated bonds in the polymer molecule to form in effect a thermoset product which can no longer be fabricated or worked except by machining. The vulcanized polymers have found wide utility because of the significant improvements in physical properties brought about by crosslinking. Natural rubber, for example, may be crosslinked or vulcanized by the use of sulfur which reacts with the unsaturated carbon atoms in the polymer molecule to form a bridge between two molecules so that one polymer molecule is covalently bonded to the second molecule. If sufficient crosslinks of this type occure, all molecules are joined in a single giant molecule. Once extensively crosslinked, the polymer is intractable and insoluble and can no longer be fabricated except possibly by machining. It has, however, significantly improved physical properties. Thus, by vulcanizing rubber, tensile strength, elasticity, impact resistance, flexibility, thermomechanical stability and many other properties are either introduced or improved.

A third class of polymers has recently been developed which, although pseudocrosslinked, have a softening point or softening range of temperatures and may even be dissolved in various solvents. At normal use temperatures, these polymers behave similarly to crosslinked polymers. At elevated temperatures, however, they are readily deformed and worked in the same manner as thermoplastic resins. Such polymers are said to be physically crosslinked. Examples of such materials are the ionic hydrocarbon polymers (ionomers). These products owe their unique properties to the fact that crosslinking is accomplished by ionic, rather than covalent, bonding between molecules of the polymer. Typical of these ionic polymers are copolymers of ethylene and ethylenically unsaturated mono- or dicarboxylic acids which have been neutralized by metal salts. (See, for example, British Pat. 1,011,981 and U.S. Pat. 3,264,272.)

Sulfonic acid ionomers have been prepared by copolymerizing a styrene sulfonic acid with other monomers to form plastic polymers containing ionic crosslinks. (See, for example, U.S. Pat. 3,322,734 incorporated herein by reference.)

Methods of sulfonating polymers are well known to the art. For example, aromatic-containing polymers are sulfonated by a method described in U.S. Pat. 3,072,618, wherein a complex of a lower alkyl phosphate and $SO_3$ is used as the sulfonating agent. These sulfonated aromatic polymers have generally been sulfonated to a sufficient extent to be water-soluble in the form of their alkali salts. Other aromatic-containing resins have been sulfonated, converted to their alkali metal salts and used as ion-exchange resins. Water-soluble polymers have been prepared by reacting the aromatic rings in styrene-butyl rubber graft polymers with $SO_3$ to form a viscous sulfonation product; see, for example, Soviet Pat. 211,079.

Attempts have been made to sulfonate unsaturated polymers. Natural rubber has been sulfonated by complexing chlorosulfonic acid with ethers and esters and reacting the complex with the rubber in solution; see, for example, German Pats. 582,565, 550,243 and 572,980, wherein water-soluble products were obtained by sulfonating the rubber and preparing salts of acids with alkalis, alkaline earths, heavy metals and organic bases. The highly-sulfonated rubbers were found to be water-soluble per se.

Saturated polyolefins have similarly been sulfonated utilizing complexes of lower alkyl phosphorus compounds and $SO_3$. (See, for example, U.S. Pat. 3,205,285, which teaches that dyeability of polypropylene may be improved by reacting polypropylene fibers with an $SO_3$ complex.) The reaction of such treated fibers with alkali salts improves their dyeability.

More recently sulfonic acid ionomers of unsaturated elastomers have been prepared using the complexing agents described in U.S. Pat. 3,072,618. These elastomeric sulfonic acid ionomers exhibit improved tensile strength in the gum state. More particularly, the green strength of the polymer is substantially enhanced; see, for example, Belgian Pat. 71,861 and its U.S. counterpart, Patent Application 877,849 now U.S. Pat. 3,642,728, incorporated herein by reference.

Acyl sulfates are known to be effective sulfonating agents for aromatic compounds; see, for example, Gilbert, *Sulfonation and Related Reactions*, pp. 22–23, Interscience, New York (1965).

SUMMARY OF THE INVENTION

It has surprisingly now been found that vulcanizable olefinically-unsaturated elastomeric sulfonic acid ionomers may be prepared by using as a sulfonating agent, an acyl sulfonate. These sulfonating agents are prepared either by the reaction of the anhydride of a monocarboxylic acid with sulfuric acid or the reaction of the monocarboxylic organic acid with $SO_3$.

The products produced by the process of this invention have improved properties over the sulfonic acid ionomers which are sulfonated utilizing other complexing agents. Especially advantageous results are obtained when the sulfonic acid groups are neutralized with a primary amine.

DETAILED DESCRIPTION

This invention relates to sulfonated polymers and in particular to a method for preparing sulfonic acid ionomers from polymers containing olefinic unsaturation using an acyl sulfate as the sulfonating agent.

The term "olefinically unsaturated polymer" as used in the specification and claims means polymers both synthetic or natural having in said polymer structure sites of olefinic unsaturation whether in the backbone, pendant therefrom or cyclic.

In particular, unsaturated polymers of this invention include low unsaturation polymers such as butyl rubber, halogenated butyl rubber, EPDM and polyisobutylene, and high unsaturation polymers such as polybutadiene and polyisoprene. In addition to these elastomers, suitable sulfonic acid-containing polymers may be prepared from plastic polymers prepared by the polymerization of ethylene or propylene with multiolefins such as hexadiene, dicyclopentadiene, norbornadiene, methylene norbornene, ethylidene norbornene, propylidene norbornene, 1,5-cyclooctadiee, etc. Preferably these polymers have incorporated therein about 0.2 to about 10 mole percent unsaturation, more preferably about 0.5 to 6%, most preferably about 1 to about 4%, e.g. 2%. These plastics may also be terpolymers of ethylene, propylene and one or more of the aforesaid multiolefin. Illustrative of these plastic polymers is a product containing about 90 mole percent ethylene, about 9% propylene, and about 1% of diene monomer.

Though the term "olefinic unsaturation" does not include aromatic unsaturation, the polymer backbone may contain aromatic rings either within the backbone structure or pendant therefrom. Sulfonation, however, is preferentially carried out at the site of the olefinic unsaturation rather than on the aromatic ring.

The expression "butyl rubber" as employed in the specification and claims is intended to include copolymers made from a polymerization reactant mixture having therein 70 to about 99.5% by weight of an isoolefin which has about 4 to about 7 carbon atoms, e.g. isobutylene and about 0.5 to 30% by weight of a conjugated multiolefin having about 4 to about 14 carbon atoms, e.g. isoprene. The resulting copolymer contains 85 to 99.8% by weight of combined isoolefin and about 0.2 to 15% of combined multiolefin.

Butyl rubber generally has a Staudinger molecular weight of about 20,000 to about 500,000, preferably about 25,000 to about 400,000, especially about 100,000 to about 400,000 and a Wijs Iodine Number of about 0.5 to 50, preferably 1 to 15. The preparation of butyl rubber is described in U.S. Pat. 2,356,128 which is incorporated herein by reference.

For the purposes of this invention the butyl rubber may have incorporated therein from about 0.2 to 10% of combined multiolefin, preferably 0.5 to about 6%, more preferably about 1 to about 4%, e.g. 2%.

Illustrative of such butyl rubber is Enjay Butyl 268 (Enjay Chemical Co.) having a viscosity average molecular weight of about 450,000, a mole percent unsaturation of about 1.5% and a Mooney viscosity of about 55 at 260° F.

Halogenated butyl rubber is commercially available and may be prepared by halogenating butyl rubber in a solution containing about 1 to about 60% by weight of butyl rubber in a substantially inert $C_5$–$C_8$ hydrocarbon solvent such as pentane, hexane, heptane, etc., and contacting this butyl rubber cement with a halogen gas for a period of about 25 minutes, whereby halogenated butyl rubber and a hydrogen halide are formed, the copolymer containing up to one halogen atom per double bond. The preparation of halogenated butyl rubber is old in the art; see, e.g., U.S. 3,099,644 which is incorporated herein by reference. This invention is not intended to be limited in any way by the manner in which butyl rubber is halogenated and both chlornated and brominated butyl rubbers are suitable for use in this invention.

Illustrative of halogenated butyl rubbers is Enjay Butyl HT–10–66 (a chlorinated butyl rubber containing about 1.3% chlorine, having about 1.7 mole percent unsaturation and a viscosity average molecular weight of about 357,000).

Low molecular weight butyl rubbers, i.e. butyl rubbers having a viscosity average molecular weight of about 5,000 to about 85,000 and a mole percent unsaturation of about 3 to about 5 may be sulfonated by the process of this invention. Preferably, these polymers have a viscosity average molecular weight of about 25,000 to about 60,000; see, for example, U.S. Patent Application No. 753,700 incorporated herein by reference.

The term "EPDM" is used in the sense of its definition as found in ASTM–D–1418–64 and is intended to mean terpolymers containing ethylene and propylene in the backbone and a diene in the side chain. Illustrative methods for producing these terpolymers are found in U.S. Pat. 3,280,082, British Pat. 1,030,289 and French Pat. 1,386,600, which are incorporated herein by reference. The preferred polymers contain about 45 to about 80 weight percent ethylene and about 2 to about 10 weight percent of a diene monomer, the balance of the polymer being propylene. Preferably the polymer contains about 50 to about 60 weight percent ethylene, e.g. 56 weight percent and about 2.6 to about 4.0 weight percent diene monomer, e.g. 3.3 wt. percent. The diene monomer is preferably a non-conjugated diene.

Illustrative of these nonconjugated diene monomers which may be used in the terpolymer (EPDM) are hexadiene, dicyclopentadiene, ethylidene norbornene, methylene norbornene, propylidene norbornene, and methyl tetrahydroindene. A typical EPDM is Vistalon 4608 (Enjay Chemical Co.), a polymer having a Mooney viscosity at 212° F. of about 90 prepared from a monomer blend having an ethylene content of about 56 wt. percent and a nonconjugated diene content of about 2.6 wt. percent.

The high unsaturation elastomers which are suitable for use in this invention include natural rubber, polybutadiene and polyisoprene. For the purposes of this invention, it is preferred that the high unsaturation polymer have a Mooney viscosity of about 20 to about 80 at 260° F. The molecular weight range is preferably about 25,000 to 500,000 determined by the Staudinger molecular weight method, more preferably about 40 to 400,000.

The term "low unsaturation elastomer" is intended to mean elastomers having an Iodine Number of about 1 to 50, preferably about 6 to 25, more preferably about 4 to 15. The term "high unsaturation elastomers" is intended to mean polymers having an iodine Number of about 51 to about 600, preferably 65 to 600, more preferably about 100 to 450.

Examples of other high unsaturation rubbers which may be sulfonated by the method of this invention include isoprene-butadiene copolymers, isoprene-chloroprene copolymers, butadiene-chloroprene copolymers, polychloroprene and chloroprene copolymers. Illustrative of another highly unsaturated polymer is a copolymer of isobutylene with a conjugated diolefin; see, for example, U.S. Pat. 2,739,141, which is incorporated herein by reference.

In carrying out the present invention, an olefinically unsaturated polymer is sulfonated with a sulfonating agent comprising an acyl sulfate. The sulfonating agent is prepared by reacting the anhydride of a monobasic acid with sulfuric acid or the monobasic organic acid with $SO_3$.

Acyl sulfates prepared from polybasic acids, e.g. succinic anhydride are ineffective.

The term "monobasic acyl sulfate" as used in the specification and claims means acyl sulfates prepared from the anhydrides of monobasic acids by their reaction with $H_2SO_4$ or the reaction of the monobasic acid with $SO_3$.

Although the acyl sulfates of this invention may be prepared in solution they are preferably prepared neat by the addition of concentrated sulfuric acid to the anhydride. The sulfate may also be prepared in solution; preferably in a low boiling solvent, e.g. methylene chloride, which acts as a heat transfer agent during preparation.

The acyl sulfate may be formed at about $-100°$ C. to about $+50°$ C., more preferably $-40°$ to $+30°$ C., e.g. $20°$ C. Preferably the acyl sulfate is prepared immediately prior to use. In situ preparation of the acyl sulfate in the polymer solution has also been found to be adequate, e.g. the anhydride may be added to the polymer solution and the $H_2SO_4$ added thereafter. Where the acyl sulfate is prepared in a solvent prior to use, its concentration in solvent should be about 0.5 to about 25 wt. percent, more preferably about 1 to about 20 wt. percent, most preferably about 10 to 20 wt. percent, e.g. 18 wt. percent.

Sulfonation may be carried out at any suitable temperature, for example, $-100°$ C. to as high as $100°$ C. Moreover, pressure is not a critical condition and may be adjusted to any satisfactory level. For instance, the sulfonation may be carried out from a reduced pressure of, say, about 0.5 atmospheres up to a superatmospheric pressure in the area of 10 atmospheres and above. The most suitable conditions from an economic standpoint are temperatures of $15°$ to $40°$ C. and a pressure of about atmospheric. The sulfonation time will, of course, vary with the particular conditions selected, the polymer being sulfonated, and the complex used. Generally, the reactions are complete within a few seconds to several hours after the reactants are contacted with each other. When sulfonating at approximately room temperature and atmospheric pressure, the contact time should be about 5 seconds to about 25 to about 30 minutes.

It has been found that soluble sulfonated polymers may be prepared within the framework of this invention. The level of sulfonation in the polymers of this invention may vary from about 0.08 mole percent to about 15 mole percent. At higher levels the polymers are readily attacked by water. Excess swelling of the products occurs, thereby limiting their suitability as elastomer or plastic materials. Preferably, the degree of sulfonation is about 0.08 to about 10 mole percent, more preferably about 0.1 to about 8 mole percent, most preferably about 0.2 to about 8 mole percent. Ideally, from the standpoint of fabricability and improved physical properties, the sulfonate level is about 0.2 to about 4 mole percent, e.g. about 0.25 to about 3 mole percent.

In the practice of this invention, the polymer to be sulfonated is dissolved in a suitable solvent and reacted with acyl sulfate prepared by reacting the anhydride of a monobasic acid with $H_2SO_4$ or the monobasic acid with $SO_3$. The solvent medium used in the reaction, is preferably a good solvent for the polymer whereas the acyl sulfate need only be partially soluble in the polymer cement thus formed.

Illustrative of such solvents are alkanes, chlorinated alkanes, aromatics, ethers, esters or mixtures thereof. The alkane may be linear, branched or cyclic.

Illustrative of these alkanes are hexane, pentane, butane, cyclohexane, heptane and homologues and analogues thereof. Illustrative of the chlorinated alkanes are methyl chloride, ethyl chloride, dichloroethane, chloroform, methylene chloride, carbon tetrachloride or any higher alkane or chlorinated alkane. Halogenated analogues of these solvents, e.g. tetrachloroethylene, trichloroethylene, etc., may also be used.

Illustrative of the suitable ethers and esters are tetrahydrofuran, p-dioxane, diethyl ether, amylethyl ether, bis-pentachloroethyl ether, bis-beta chloroisopropyl ether, butyl acetate, isoamyl acetate and cyclohexyl acetate.

Preferably, the solids content of the polymer solution is less than 25 wt. percent. Higher solid content presents some handling problems due to high viscosities. Nevertheless, cement as high as 60 wt. percent can be employed if sufficient mixing power is available. More preferably the solids content is about 5 to about 20 wt. percent most preferably about 10 to about 20 wt. percent.

Sulfonation of the polymer is conducted at a temperature between $-100$ to $+100°$ C. Sulfonation occurs when the complex, either in solution or neat, is added to the polymer solution. Though the acyl sulfate is preferably added directly without solvent, it may be introduced in a solvent medium. The reaction time may be from 5 seconds to 5 hours. The product remains soluble throughout the reaction period. The product is most easily recovered by flashing off the solvent in hot water; preferably the sulfonic acid groups are neutralized prior to flashing. The water also decomposes any unreacted complex. The product may also be recovered by evaporation.

The sulfonated polymers may be purified further, if necessary, by kneading in the presence of low-boiling ketones or alcohols. The preferred materials for this purpose are acetone and methanol. After kneading, the polymers are dried on hot mills or in heated, vented extruders. The recovered products are soluble in a variety of solvents which indicates that the sulfonation has been accomplished without crosslinking.

The sulfonic acid-containing polymers have improved properties over those of unsulfonated polymers. Furthermore, the sulfonated polymers of this invention have improved properties over those ionomers prepared using complexes of Lewis acids and $SO_3$ donors as taught by U.S. Application Ser. No. 877,849 incorporated herein by reference.

Where the polymer to be sulfonated is a highly unsaturated polymer, the sulfonation level is preferably less than 15 mole percent $SO_3H$ to avoid gelation of the product and to avoid sensitivity to water swelling; more preferably, the upper sulfonation level for these polymers is about 0.5 to about 10 mole percent, most preferably about 2 to about 8 mole percent, i.e. about 3 to about 6 mole percent.

The level of sulfonation depends to a large extent upon the application. For many uses, it is desirable to have sulfonated polymers with high tensile strength and modulus which can be processed at temperatures of about $130°$ C. Another important factor in addition to sulfonation level which must be considered is the molecular weight. Higher molecular weight polymers are more difficult to process because the act of processing must destroy the physical entanglement of the network. Higher molecular weight polymers have a greater number of physical entanglements. The preferred upper sulfonation level ($SO_3H$) for polymers having a number average molecular weight of about 250,000 is about 3 mole percent and for polymers having a number average molecular weight of about 50,000, the preferred upper limit is about 9 to 14 mole percent for good processability. These preferred limits, however, apply only where processability is a factor.

Although the sulfonated polymers may be neutralized to form the ionomers with a variety of neutralizing compounds such as metal salts and amines, it has been found that surprisingly improved results are obtained when ethylamine is used as the neutralizing agent.

In preparing the ionomer, it is not necessary to neutralize every sulfonic acid group. Preferably, at least 1% of the sulfonic acid groups are neutralized, though 100% of the acid groups may be neutralized if desired; more preferably about 2 to about 90% of the sulfonic acid groups are neutralized; most preferably about 50 to about 90% are neutralized.

The advantages of the sulfonated polymers of this invention may be more readily appreciated by reference to the following examples.

Example 1

Solutions of butyl rubber were prepared in hexane and benzene at a concentration of 15 weight percent rubber in the respective solvents. The butyl rubber was then sulfonated using as the sulfonating agents acetyl sulfate

Example 2

In order to demonstrate the effectiveness of ethylamine as a neutralizing agent for the sulfonic acid-containing polymers, butyl rubber was sulfonated using both acetyl sulfate and phosphate ester $SO_3$ complexes as the sulfonating agent and the polymers so formed were neutralized both with sodium hydroxide and ethylamine. The data are shown in Table II.

TABLE II
[Comparison of ethylamine and NaOH as neutralizing agents]

| | Polymer—Butyl rubber [1] | | | | |
|---|---|---|---|---|---|
| | $CH_3\text{-}C(\text{=}O)\text{-}O\text{-}S(\text{=}O)_2\text{-}OH$ | $CH_3\text{-}C(\text{=}O)\text{-}O\text{-}S(\text{=}O)_2\text{-}OH$ | $CH_3\text{-}C(\text{=}O)\text{-}O\text{-}S(\text{=}O)_2\text{-}OH$ | $(EtO)_3P\text{-}O(SO_3)_3$ | $(EtO)_3P\text{-}O(SO_3)_3$ |
| Neutralizing agent (1/1 neut. ratio) | NaOH | NaOH | $CH_3CH_2NH_2$ | $CH_3CH_2NH_2$ | $CH_3CH_2NH_2$ |
| Added salt (ca. 6 wt. percent) | | ([2]) | | | ([2]) |
| Mole percent sulfur (actual) | 1.2 | 1.2 | 1.2 | 1.0 | 1.0 |
| Mooney viscosity (ML 260° F., 5+8 min at 0.2 r.p.m.) | 130 | 130 | 80 | 74 | 70 |
| Intrinsic viscosity in $CHCl_3$ | [3] 0.270 | [3] 0.278 | 0.95 | 1.38 | 1.22 |
| Physical properties: (pads, 30 at 350° F.): | | | | | |
| 100% modulus (p.s.i.) | 250 | 180 | 125 | 80 | 80 |
| 300% modulus (p.s.i.) | 725 | 505 | 225 | 155 | 145 |
| 500% modulus (p.s.i.) | 1,280 | 950 | 405 | 255 | 215 |
| Tensile strength (p.s.i.) | 1,400 | 2,000 | 3,400 | 2,450 | 1,750 |
| Percent elongation | 500 | 660 | 950 | 1,075 | 1,075 |
| Tensile product ×10⁵ | 7.0 | 13.2 | 32.2 | 26.4 | 18.8 |
| Molding characteristics | ([4]) | Poor | Excellent | Excellent | Excellent |

[1] An isoprene containing butyl rubber having a Mooney viscosity (ML 1+3) at 260° F. of 55 and about 1.9 wt. percent unsaturation.
[2] Ethylammonium acetate.
[3] Contained gel.
[4] Very poor.

and triethyl phosphate-$SO_3$ complex. The polymers prepared by use of each of the sulfonating agents were then neutralized with ethylamine. The materials were sulfonated to a mole percent $SO_3EA$ level of 1.0. The results were shown in Table I.

TABLE I
Effect of sulfonating agent on physical properties of butyl rubber [2]

| | Polymer—Butyl | | | |
|---|---|---|---|---|
| Solvent | Hexane | Benzene | Hexane | Benzene |
| Sulfonating agent | Acetyl sulfate | Acetyl sulfate | TEP/ $SO_3$ [1] | TEP/ $SO_3$ [1] |
| Mole percent $SO_3^-EA^+$ | 1.0 | 1.0 | 1.0 | 1.0 |
| Mooney viscosity ML 260° F., 5+8 min. at 0.2 r.p.m. | 69 | 72 | 74 | 62 |
| Physical properties (gum, pressed 30' at 350° F.): | | | | |
| Tensile strength, p.s.i. | 3,500 | 3,850 | 2,450 | 950 |
| Percent elongation | 1,000 | 1,025 | 1,075 | 1,150 |

[1] TEP/$SO_3$ = $(C_2H_5O)_3PO(SO_3)_3$.
[2] An isoprene containing butyl rubber having a Mooney viscosity (ML 1+3) at 260° F. of 55 and about 1.9 wt. percent unsaturation.

It will be noted that where the sulfonating agent is acetyl sulfate the product so formed is substantially improved in tensile strength over material sulfonated using the phosphate ester complex. Particularly surprising is the fact that sulfonation in benzene using the acetyl sulfate results in products having improved properties over even those obtained using acetyl sulfaee in hexane.

Acetyl sulfate is known to sulfonate aromatic materials. [See, for example, Gilbert, *Sulfonation and Related Reactions*, Interscience Publishers (1965).] Surprisingly despite this fact, sulfonation of the polymer takes place preferentially notwithstanding the high ratio of benzene to polymer and results in products of a higher tensile strength than that produced by sulfonation of the same polymer in hexane with acetyl sulfate. More significant, however, is the fact that the material prepared using acetyl sulfate has a tensile strength of approximately 50% greater than that of ionomers prepared using phosphate ester complexes.

A comparison of run 1 and run 3 demonstrate the improvement which is achieved by sulfonating with acetyl sulfate and neutralizing with ethylamine. The tensile strength of the product of run 3 is approximately 2½ times that of the product of run 1.

It was speculated that a cause of the improved properties might be a plasticizing effect of ethyl ammonium acetate which is formed by residual acetic acid in the reactant medium thereby resulting in better molding characteristics. In order to demonstrate this point, ethyl ammonium acetate was added to the neutralized polymer. As demonstrated in Table II, run 2, although the ethyl ammonium acetate salt had a beneficial effect, the effect was not as significant as the effect of neutralizing with ethylamine run 3. Runs 4 and 5 are comparative runs wherein triethyl phosphate ester complexing agent and $SO_3$ were used as the sulfonating agent. The sulfonated polymers of runs 4 and 5 were neutralized with ethylamine. Additionally, ethyl ammonium acetate was added to the neutralized polymer of run 5. In this case, addition of the ethyl ammonium acetate resulted in a product inferior to that which did not include the salt.

The above examples demonstrate that the product prepared using acetyl sulfate as the sulfonating agent and ethylamine as the neutralizing agent, results in surprisingly improved sulfonated ionomers when compared with other sulfonating techniques whether or not ethylamine is used as the neutralizing agent in those other cases.

Example 3

Nineteen (19.0) milliliters of butyric anhydride was added to 95.5 milliliters of methylene chloride in a sealed and stirred four-necked flask. Five (5.5) milliliters of $H_2SO_4$ was added slowly. Portions of this material (butyryl sulfate in methylene chloride) were added to known quantities of butyl cement (16.8 wt. percent solids). The reaction was neutralized with ethylamine (70% in $H_2O$) and stabilized with about 0.2 wt. percent PBN (phenyl-β-naphthylamine). The stripped and dried polymer was tested for its physical properties and the results appear in Table III. Similar samples were prepared at equivalent sulfonated levels using acetic anhydride; the results shown in Table III indicate that acetyl sulfate and butyryl sulfate are equivalent sulfonating agents.

TABLE III

|  | 1 | 2 | 3 | 4 |
|---|---|---|---|---|
|  | Acetic anhydride | | | |
| Polymer (g.) [1] | 793 | 843 | 835 | 823 |
| $CH_3CO_2SO_3H$ (ml.) | 9.8 | 19.6 | 29.3 | 39.3 |
| $CH_3CH_2NH_2$ (g.) | 2.1 | 4.3 | 6.4 | 8.5 |
| PBN (g.) | .25 | .25 | .25 | .25 |
| Mole percent $SO_3^-EA^+$ | 0.30 | 0.57 | 0.91 | 1.2 |
| Tensile strength (p.s.i.) | 800 | 2,700 | 3,650 | 3,800 |
| Percent elongation | 1,400 | 1,000 | 950 | 950 |
|  | Butyric anhydride | | | |
| Polymer [1] | 788 | 835 | 798 | 790 |
| $CH_3CH_2CH_2CO_2SO_3H$ (ml.) | 9.8 | 19.6 | 29.1 | 39.1 |
| $CH_3CH_2NH_2$ (g.) | 2.1 | 4.3 | 6.3 | 8.5 |
| PBN | 0.25 | 0.25 | 0.25 | 0.25 |
| Mole percent $SO_3^-EA^+$ | 0.32 | 0.63 | 1.03 | 1.3 |
| Tensile strength (p.s.i.) | 1,200 | 3,100 | 3,500 | 3,800 |
| Percent elongation | 1,075 | 950 | 925 | 900 |

[1] Butyl rubber—an isoprene containing butyl rubber having a Mooney viscosity (ML 1+3) at 260° F. of 55 and about 1.9 wt. percent unsaturation.

An attempt to accomplish the same results using succinic, phthalic and octadecyl succinic anhydride proved unsuccessful. No reaction occurred. Not wishing to be bound by theory, this is believed to be due to the fact that the anhydrides or their sulfates were not soluble in the solvents used, e.g. hexane, chloroform and benzene.

Example 4

Various other acyl sulfates were prepared using the following reactant ratios:

TABLE IV
[Preparation of acyl sulfates]

| Anhydride | Ml. anhydride | Ml. $CH_2Cl_2$ | Ml. $H_2SO_4$ (96%) |
|---|---|---|---|
| Propionic | 6.95 | 90.37 | 2.68 |
| Isobutyric | 9.15 | 88.17 | 2.68 |
| n Heptanoic | 14.3 | 83.02 | 2.68 |
| Chloroacetic | 9.4 | 82.5 | 2.68 |

The mole ratio of anhydride to sulfuric acid was the same in each case and equal to 1.1:1. The acyl sulfates so formed were used to sulfonate butyl rubber which was then neutralized with ethylamine. The results appear in Table V.

TABLE V
[Comparison of sulfonated butyl rubbers [1] prepared with various acyl sulfates]

| Acyl sulfate product properties | Propionyl | Isobutyryl | n Heptanoyl | Chloroacetyl |
|---|---|---|---|---|
| Mooney viscosity (ML, 260° F., 5+8 min at 0.2 r.p.m.) | 83 | 74 | 60 | 71 |
| Mole percent sulfur ($SO_3EA$) | 0.6 | 0.72 | 0.78 | 0.72 |
| Wt. percent chlorine | | | | 0.06 |
| Physical properties: [1] | | | | |
| 100% Modulus (p.s.i.) | 85 | 75 | 70 | 60 |
| 300% Modulus (p.s.i.) | 175 | 140 | 110 | 100 |
| 500% Modulus (p.s.i.) | 310 | 205 | 140 | 135 |
| Tensile strength | 4,200 | 1,860 | 1,630 | 2,025 |
| Percent elongation | 1,000 | 1,000 | 1,100 | 1,200 |

[1] Butyl rubber—an isoprene containing butyl rubber having a Mooney viscosity (ML 1+3) at 260° F. of 55 and about 1.9 wt. percent unsaturation.

All of these acyl sulfates were effective sulfonating agents. It is evident, however, that propionyl sulfate produces a superior product (based on tensile strength) as do acetyl and butyryl sulfates. This isobutyryl and N heptanoyl sulfates produce a product similar to that of the other prior art methods of sulfonation while chloroacetyl sulfate makes a slight improvement.

Hence the preferred acyl sulfates are unsubstituted $C_2$-$C_4$ linear monobasic acyl sulfates. The term "unsubstituted" as used in the specification and claims means that the compound contains only carbon and hydrogen atoms in addition to the sulfate group. The term "linear" as used in the specification and claims means nonbranched straight-chain carbon backbone. Particularly preferred acyl sulfates are acetyl sulfate, propionyl sulfate and butyryl sulfate.

Example 5

This example illustrates the advantage in uncured gum properties (green strength) obtained using acetyl sulfate vs triethylphosphate:sulfur trioxide.

The general procedure for preparing the sulfonated polymers was as follows:

Butyl cement (16 wt. percent in hexane) was placed in stirred flask fitted with a condenser. Sufficient sulfonating agent was added to incorporate 0.75 mole percent $SO_3H$ groups into the polymer backbone. The sulfonated polymer was then neutralized with the appropriate base to a pH=7. A stabilizer, phenyl-β-naphthylamine, (0.2 wt. percent based on polymer) was then added. The cement was steam stripped, dried on a hot mill, molded and tested on an Instron. The results are shown in Table VI.

TABLE VI
[Comparison of physical properties of butyl [1] sulfonated with acetyl sulfate vs. triethylphosphate-sulfur trioxide complex]

| | Reagent | | | | | |
|---|---|---|---|---|---|---|
| | Acetyl sulfate | | | Triethylphosphate: sulfur trioxide | | |
| Base | NaOH | $CH_3CH_2NH_2$ | $(CH_3CH_2)_3N$ | NaOH | $CH_3CH_2NH_2$ | $(CH_3CH_2)_3N$ |
| Mole percent $SO_3^-M^+$ (±0.05) | 0.75 | 0.75 | 0.75 | 0.75 | 0.75 | 0.75 |
| Mooney viscosity (ML, 260° F., 5+8 min, at 0.2 r.p.m.) | [2] >130 | 78 | 62 | >130 | 62 | 45 |
| Physical properties (unvulcanized gum film, molded 30 /350° F.): | | | | | | 00 |
| Tensile strength (p.s.i.) | 875 | 3,100 | 1,850 | 850 | 1,600 | 5 |
| Percent elongation | 550 | 1,000 | 1,200 | 650 | 1,150 | >1,500 |
| Appearance of test sample | [3] | Excellent | Excellent | [3] | Excellent | Excellent |

[1] An isoprene containing butyl rubber having a Mooney viscosity (ML 1+3) at 260° F. of 55 and about 1.9 wt. percent unsaturation.
[2] Beyond the range of the machine.
[3] Very poor.

These results clearly show the advantage of acetyl sulfate especially where the neutralizing agent is an amine, preferably a primary amine. With metal hydroxide, the test samples were too tough to mold and no true comparison could be obtained.

Example 6

A butyl rubber having an iodine number of 17.0 (2.5 mole percent unsaturation) was dissolved in 1000 ml. of benzene. Acetic anhydride, 4.2 ml. (0.0445 m), was added to the polymer solution. Concentrated sulfuric acid (96.5%), 2.46 ml., was added slowly with stirring to the solution of polymer and acetic anhydride. In one hour the temperature of the reaction mixture rose from 27 to 29.0° C. The reaction mixture was stirred for an additional two hours at room temperature. The reaction mixture was neutralized with ammonium hydroxide and the product was precipitated from solution with isopropyl alcohol. The product was redissolved in hexane and reprecipitated with alcohol. The residual solvents were vaporized from the product at 100° C. under vacuum.

The solvent-free product was tough, but soluble in a mixture of hexane, chloroform and isopropyl alcohol. The product analysis showed a sulfur content of 1.27% which corresponds to a sulfonation level of 2.24 mole percent and green strength (gum) of 2200 p.s.i. at an elongation at break of 800%.

Hence it is evident that sulfonation may be carried out without degradation of polymer by the in situ formation of sulfonating agent.

Example 7

One hundred grams (100 g.) of an ethylene-propylene-ethylidene norbornene terpolymer (EPDM) was dissolved in 1500 ml. of benzene and the polymer was sulfonated by contacting it with two times the calculated amount (0.075 mole) of acetyl sulfate (19.4 g. acetic anhydride and 8.32 ml. of $H_2SO_4$). The reaction mixture became gelatinous and very difficult to stir. The $NH_4OH$ neutralized product was precipitated from the solvent by means of isopropyl alcohol. The solvent-free product when pressed in a mold gave a clear, rubbery, and very tough film.

Example 8

The experiment of Example 7 was reproduced except that an acetyl sulfate to unsaturation mole ratio of 1:2 was used.

Upon analysis, the isolated product showed a sulfur content of 0.99% which corresponds to 41% of the theoretical degree of sulfonation. The product was obtained in a crumb form.

Example 9

The experiment of Example 8 was reproduced except that an acetyl sulfate to unsaturation mole ratio of 1:1 was used. The sulfonated product showed a sulfur content of 1.74% which corresponds to a sulfonation level of 72.5% of the theoretical.

Example 10

An ethylene-propylene copolymer with an ethylene content of 42.8%, 100 g. was dissolved in 1500 ml. of benzene and sulfonated for one hour at 47° C. with acetyl sulfate prepared by premixing in the cold (20° C.) 5 ml. of acetic anhydride and 2.1 ml. of 96.5% $H_2SO_4$. The reaction product was neutralized with an alcoholic ammonium hydroxide solution (20 ml. $NH_4OH$ and 30 ml. of isopropyl alcohol). The product was precipitated from solution with methanol. The residual solvents were vaporized from the product at 60° C. under high vacuum. The isolated product was light in color and showed a sulfur content of 0.58%. The polarity imparted to the polymer by sulfonation enhances its dyeability with basic dyes.

Example 11

The experiment of Example 10 was repeated except that the reaction temperature was 25 to 56.5° C. and the amount of acetyl sulfate was three times that of Example 10. The product showed a sulfur content of 1.62%. The sulfur level of this product is 2.8 times that of the product from Example 10. Not wishing to be bound by theory since the sulfur level exceeds that which would be expected on the basis of the unsaturation level of the polymer, it is thought that sulfonation also occurs at the teritary hydrogen of the propylene units in the copolymer.

Example 12

Amine-neutralized sulfonic acid ionomers of butyl rubber were prepared in the manner of Example 1. The results showing the effect of various primary amines on physical properties is shown in Table VII and VIII.

TABLE VII
[Primary amines (straight chain) in sulfonated butyl rubber]

| | 1 | 2 | 3 | 4 | 1 | 2 | 3 | 4 | 1 | 2 | 3 | 4 |
|---|---|---|---|---|---|---|---|---|---|---|---|---|
| Base (pKb) | $CH_3CH_2NH_2$ (3.30) | | | | $CH_3(CH_2)_3NH_2$ (3.39) | | | | $CH_3(CH_2)_5NH_2$ (3.36) | | | |
| Percent $SO_3^-M^+$ (theory) | 0.5 | 1.0 | 1.5 | 2.0 | 0.5 | 1.0 | 1.5 | 2.0 | 0.5 | 1.0 | 1.5 | 2.0 |
| Percent $SO_3^-M^+$ (actual) | .44 | .80 | 1.2 | 1.7 | .37 | .75 | 1.2 | 1.5 | .38 | .84 | 1.2 | 1.5 |
| Mooney viscosity (ML 260° F., 5+8 min. at 0.2 r.p.m.) | 69 | 78 | 81 | 82 | 68 | 76 | 76 | 77 | 68 | 74 | 75 | 76 |
| [η] in $CHCl_3$ (0.5/1 conc.) | 1.35 | 1.20 | 1.00 | .60 | 1.40 | 1.20 | .90 | .70 | 1.25 | 1.15 | .80 | .65 |
| Physical properties: | | | | | | | | | | | | |
| 300% modulus (p.s.i.) | 115 | 185 | 225 | 285 | 100 | 150 | 160 | 170 | 120 | 170 | 175 | 300 |
| 500% modulus (p.s.i.) | 190 | 345 | 435 | 590 | 150 | 265 | 280 | 315 | 200 | 280 | 320 | 580 |
| Tensile strength | 3,200 | 2,900 | 3,850 | 4,100 | 2,500 | 2,900 | 3,300 | 2,500 | 1,400 | 2,150 | 2,900 | 2,950 |
| Percent elongation | 1,050 | 925 | 900 | 900 | 1,050 | 950 | 900 | 850 | 1,000 | 950 | 850 | 850 |

TABLE VIII
[Branched primary amines in sulfonated butyl rubber]

| | 1 | 2 | 3 | 4 | 1 | 2 | 3 | 4 | 1 | 2 | 3 | 4 |
|---|---|---|---|---|---|---|---|---|---|---|---|---|
| Base (pKb) | $CH_3CH_2NH_2$ (3.30) | | | | $(CH_3)_2CH-NH_2$ (3.40) | | | | $(CH_3)_3C-NH_2$ (3.32) | | | |
| Percent $SO_3^-M^+$ (theory) | 0.5 | 1.0 | 1.5 | 2.0 | 0.5 | 1.0 | 1.5 | 2.0 | 0.5 | 1.0 | 1.5 | 2.0 |
| Percent $SO_3^-M^+$ (actual) | .44 | .80 | 1.2 | 1.7 | .37 | .80 | 1.2 | 1.5 | .39 | .80 | 1.2 | 1.5 |
| Mooney viscosity (ML 260° F., 5+8 min at 0.2 r.p.m.) | 69 | 78 | 81 | 82 | 60 | 73 | 76 | 78 | 65 | 74 | 80 | 80 |
| [η] in $CHCl_3$ (0.5/1 conc.) | 1.35 | 1.20 | 1.00 | .60 | 1.35 | 1.10 | .90 | .60 | 1.50 | 1.20 | 1.05 | .70 |
| Physical properties: | | | | | | | | | | | | |
| 300% modulus (p.s.i.) | 115 | 185 | 225 | 285 | 1.25 | 1.75 | 200 | 200 | 105 | 155 | 200 | 210 |
| 500% modulus (p.s.i.) | 190 | 345 | 435 | 590 | 150 | 270 | 350 | 375 | 165 | 280 | 400 | 425 |
| Tensile strength | 3,200 | 2,900 | 3,850 | 4,100 | 2,400 | 3,400 | 3,400 | 3,550 | 1,500 | 2,800 | 3,125 | 2,850 |
| Percent elongation | 1,050 | 925 | 900 | 900 | 1,200 | 1,000 | 950 | 900 | 1,050 | 900 | 900 | 825 |

[1] An isoprene containing butyl rubber having a Mooney viscosity (ML 1+3) at 260° F. of 55 and about 1.9 wt. percent unsaturation.

Table VIII compares various straight chain amines. Although all of the straight chain amines show improved properties over other neutralization methods, it is evident that ethylamine is unique in its improvement of properties when used as the neturalizing agent.

Table VIII compares primary and branched amines and shows that although the branched amines yield neutralized products with improved properties over butyl rubber ionomers sulfonated by prior art methods, ethylamine is a preferred amine.

Example 13

In order to compare, secondary and tertiary amines and eliminate any effect of chain length of the organic group, the experiments of Example 12 were repeated using ethylamine, diethylamine and triethylamine as the neutralizing agents. The results are shown in Table IX.

Here $R_1$ and $R_2$ are $C_1$ to $C_{12}$ alkyl or aralkyl groups. $R_1$ and $R_2$ may be the same or different.

Faster cure rates are obtained at the higher sulfonation

TABLE IX

[Primary, secondary and tertiary amines in sulfonated butyl rubber]

| Base (pKb) | $CH_3CH_2NH_2$ (3.30) | | | | $(CH_3CH_2)_2NH$ (2.96) | | | | $(CH_3CH_2)_3N$ (3.25) | | | |
|---|---|---|---|---|---|---|---|---|---|---|---|---|
| | 1 | 2 | 3 | 4 | 1 | 2 | 3 | 4 | 1 | 2 | 3 | 4 |
| Percent $SO_3^-M^+$ (theory) | 0.5 | 1.0 | 1.5 | 2.0 | 0.5 | 1.0 | 1.5 | 2.0 | 0.5 | 1.0 | 1.5 | 2.0 |
| Percent $SO_3^-M^+$ (actual) | .44 | .80 | 1.2 | 1.7 | .37 | .75 | 1.10 | 1.40 | .35 | .74 | 1.20 | 1.50 |
| Mooney viscosity (ML, 260° F., 5+8 min, at 0.2 r.p.m.) | 69 | 78 | 81 | 82 | 47 | 60 | 62 | 61 | 48 | 62 | 67 | 65 |
| [η] in $CHCl_3$(0.5/l conc.) | 1.35 | 1.20 | 1.00 | .60 | 1.68 | 1.25 | 1.25 | 1.10 | 1.30 | 1.55 | 1.65 | 1.65 |
| Physical properties: | | | | | | | | | | | | |
| 300% modulus (p.s.i.) | 115 | 185 | 225 | 285 | 85 | 115 | 115 | 125 | 85 | 100 | 130 | 125 |
| 500% modulus (p.s.i.) | 190 | 345 | 435 | 590 | 105 | 150 | 160 | 165 | 100 | 150 | 170 | 195 |
| Tensile strength | 3,200 | 2,900 | 3,850 | 4,100 | 1,100 | 1,600 | 1,800 | 2,400 | 1,000 | 1,850 | 2,200 | 2,600 |
| Percent elongation | 1,050 | 925 | 900 | 900 | 1,500+ | 1,175 | 1,150 | 1,100 | 1,500+ | 1,200 | 1,150 | 1,050 |

Again, although all amines show improvements over prior art neutralization agents when used in conjunction with the sulfonating agent of this invention, the primary amine is preferred.

Any amine may be used to neutralize the sulfonic acid groups of the sulfonated polymer. Where the amine is a weak base such as pyridine, the polymer may not be subjected to excessive heat, e.g., by milling. These polymers have utility as latices or adhesives.

Other amines such as piperazine, triethanol amine, etc., were tested. Substituents in the hydrocarbyl groups of the amine may be hydroxyl, chloro, carbonyl, ether, sulfur as thioether or $=C=S$, nitroso, etc. Any non-carbon atom substituent may therefore be included in the amine structure. The term "organic amine" as used in the specification and claims includes the substituted amines. The term "hydrocarbon amine" means those amines which include only carbon and hydrogen in their structure.

From the examples presented herein, it is evident that the preferred sulfonating agents of this invention, i.e. acetyl sulfate, propionyl sulfate and butyryl sulfate, produce improved polymeric ionomers regardless of the neutralizing agent selected. The preferred neutralizing agents, however, are primary amines, in particular ethylamine.

Sulfonated butyl rubber polymers may be dissolved in mixtures of solvents, e.g., toluene/isopropyl alcohol (90/10) and used as adhesives. These sulfonated polymers exhibited improved adhesive properties far superior to those of unmodified materials. Ethylamine neutralized sulfonic acid polymers are more soluble in mixed solvents than are those neutralized with metal salts. It is interesting to note that the products neutralized with ethylamine as opposed to other cations also exhibit reduced Mooney viscosity, notwithstanding the fact that the products themselves showed higher tensile strengths than other ionomers.

It has surprisingly been found that the unsaturated elastomeric sulfonate ionomers may be vulcanized more readily than the unsulfonated material. For example, butyl rubber is difficult to vulcanize and requires certain accelerators. The use of known accelerators for the vulcanization of sulfonated butyl rubber results in more rapid cures than can be obtained with the unsulfonated material. The accelerators which may be used for vulcanizing sulfonated butyl rubber and obtaining more rapid cures are the thiuram or dithiocarbamate accelerators. The preferred accelerators for the enhancement of the cure rate of sulfonated butyl rubber generally have the following empirical formula:

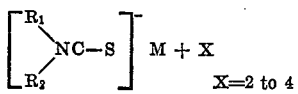

$$X = 2 \text{ to } 4$$

level. The preferred sulfonation level is about 0.25 to 1.5 mole percent; more preferably about 0.3 to .75 mole percent. The sulfonated butyl rubbers demonstrate improved ozone resistance over those compositions which are unsulfonated and cured with the same accelerators.

What is claimed is:

1. In a process for preparing a sulfonic acid ionomer of an olefinically unsaturated elastomer where in said elastomer is butyl rubber the improvement which comprises using as the sulfonating agent at least one monobasic acyl sulfate wherein said sulfate is acetyl sulfate, proprionyl sulfate or butyryl sulfate.

2. The process of claim 1 wherein the acyl sulfate is prepared by reacting the corresponding anhydride with sulfuric acid.

3. The process of claim 1 wherein the acyl sulfate is prepared by reacting the corresponding acid with $SO_3$.

4. The process of claim 1 wherein the neutralizing agent is an organic amine.

5. The process of claim 4 wherein the amine is a hydrocarbon amine.

6. The process of claim 5 wherein the amine is ethylamine.

7. The process of claim 1 wherein the acyl sulfate is prepared *in situ* by first adding the corresponding anhydride to a solution of the elastomer and subsequently adding sulfuric acid to the mixture of elastomer and anhydride.

8. The process of claim 1 wherein about one to about 100% of the sulfonic acid groups are neutralized.

9. The process of claim 8 wherein the neutralizing agent is an organic amine.

10. The process of claim 1 wherein the elastomer is butyl rubber, the acyl sulfate is acetyl sulfate and the neutralizing agent is ethylamine.

References Cited

UNITED STATES PATENTS

| 2,962,454 | 11/1960 | McRae | 260—2.2 |
| 3,205,285 | 9/1965 | Turbak | 260—89.7 |
| 3,396,136 | 8/1968 | Dickerson | 260—30.6 |
| 3,642,728 | 2/1972 | Canter | 260—79.3 R |

OTHER REFERENCES

Gilbert, Sulfonation and Related Reactions, Interscience Publ. (1965), pp. 22 and 23.

JOSEPH L. SCHOFER, Primary Examiner

C. A. HENDERSON, JR., Assistant Examiner

U.S. Cl. X.R.

260—DIG 31